2 Sheets—Sheet 1.
M. MARTIN.
Barley Peeling Mill.
No. 197,043. Patented Nov. 13, 1877.
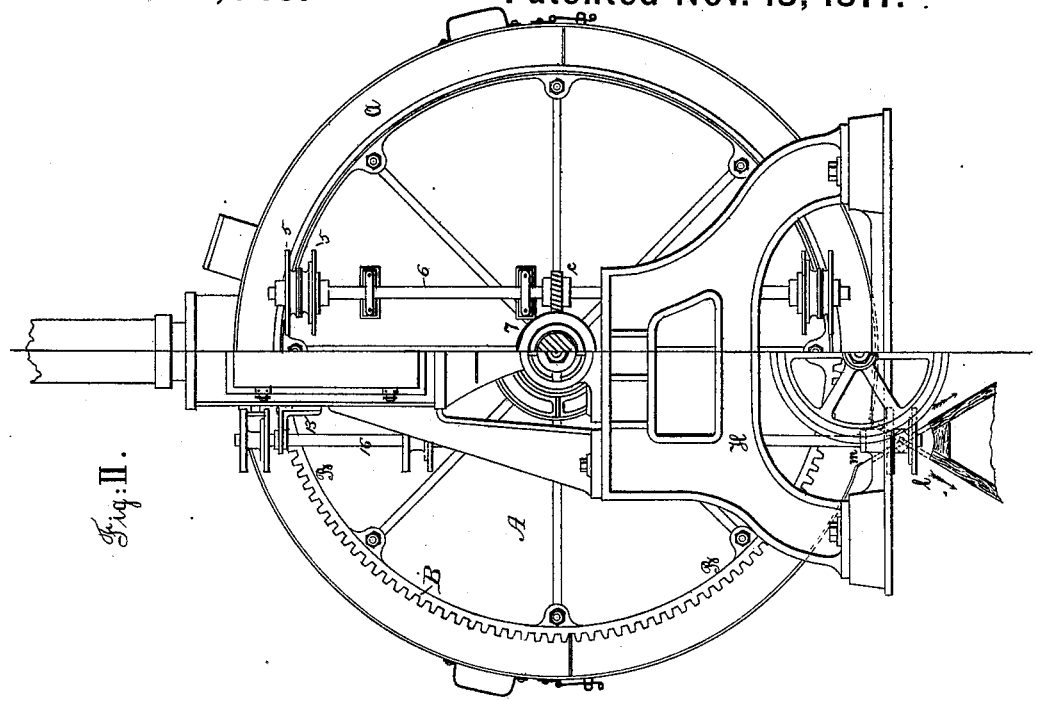
Fig: II.
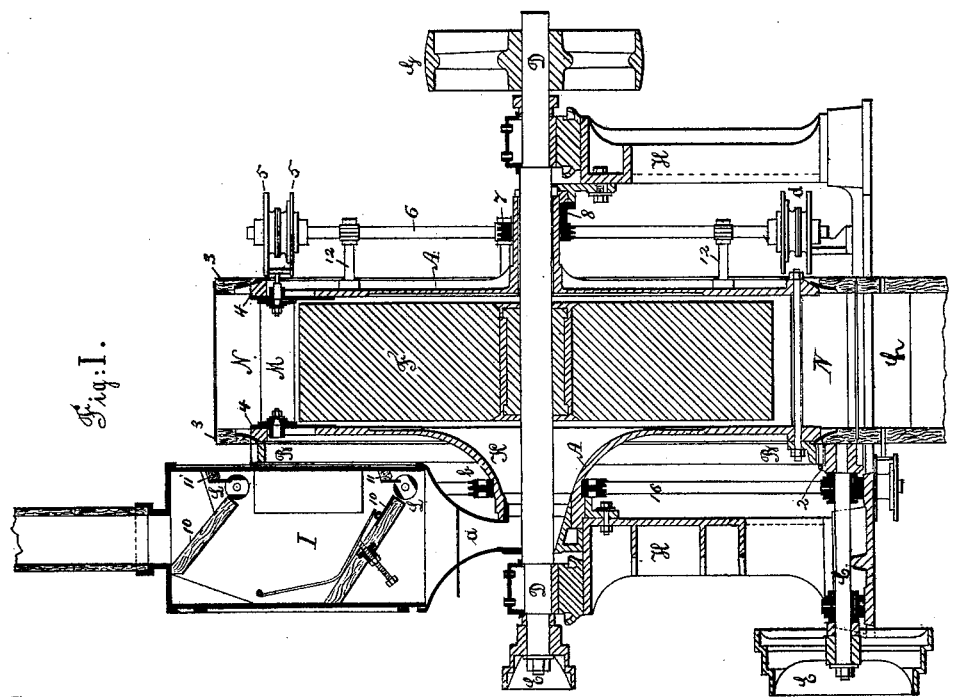
Fig: I.
Witnesses:
Carl Pfeifer
John C. Kluber.
Inventor:
Moritz Martin

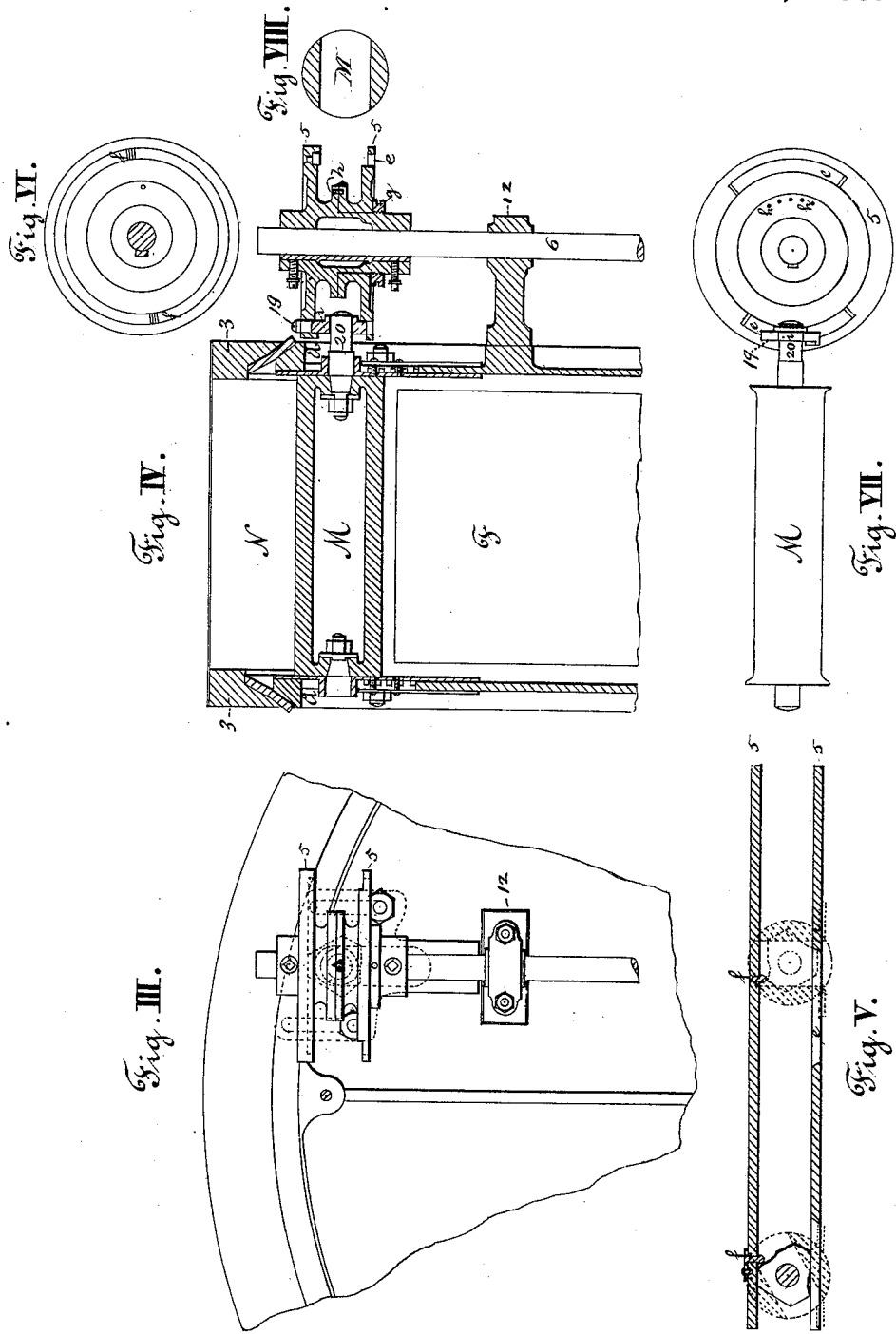

UNITED STATES PATENT OFFICE.

MORITZ MARTIN, OF BITTERFELD, PRUSSIA.

IMPROVEMENT IN BARLEY-PEELING MILLS.

Specification forming part of Letters Patent No. 197,043, dated November 13, 1877; application filed December 1, 1876; patented in Italy, June 30, 1875; patented in Great Britain, November 27, 1876.

*To all whom it may concern:*

Be it known that I, MORITZ MARTIN, of the city of Bitterfeld, Prussia, have invented certain Improvements in Machinery for Peeling Barley, with self-acting feeder and turning barrel, of which the following is a specification:

It is a well-known fact that in mills for peeling barley those provided with a vertical stone are of the most advantageous construction, both as regards the operation of the mechanism and the good quality of the product.

Many attempts have been made to provide such mills with self-acting feeders working continuously; but the results have not been fully satisfactory, because the barrel has to be fixed—that is, not turning—whereby the barley is exposed to an irregular action.

To remedy these difficulties, and to render the mills having vertical stones efficient in every respect, I have devised several improvements thereon, which will be particularly hereinafter described. My improvements are embodied in the mill illustrated in the accompanying drawings, in which drawings—

Figure 1 is a longitudinal vertical section through the main shaft; Fig. 2, a side elevation of the opposite sides of one-half of the apparatus; Fig. 3, a detached view, showing the disks in elevation; Fig. 4, a vertical section of the upper portion of the mill. Fig. 5 is a view of the disks rolled into a sectional plan, the line of the section being concentrically through the middle of the slots $e$. It shows the relative position of the slots and teeth of the disks and the mode of operating the tappets. Fig. 6 is a view of the under side of the upper disk 5. Fig. 7 is a view of the upper side of the lower disk 5, and Fig. 8 is a sectional view of one of the valves.

The barrel A in my improved mill is hung upon the main shaft D, which carries stone F fast to it, so as to turn independently thereon. It is provided on one side with a toothed crown-wheel, B, gearing into a pinion, 2, on a small shaft, C, which receives motion from the main shaft by means of pulleys E E and a belt connecting the two, the smaller pulley being keyed to the main shaft D, which carries pulley G in direct communication with the shafting. The main shaft D rests in bearings in the standards H H. The stone F is revolved by the main shaft D, and its revolutions amount to from two hundred and forty to two hundred and sixty per minute, while the barrel A, which moves in an opposite direction, makes but four to eight revolutions per minute, governed according to the relative sizes of the pulleys E E.

The feeding in of the barley from the hopper I is effected through a funnel, $a$, which is connected with the neck K of the barrel A. This feeding operation is controlled by the rotary valves L, which are solid cylinders, slotted transversely and arranged horizontally in bearings in the sides of the hopper I. These valves open and close orifices formed by partitions 10 11 arranged within the hopper, as seen in Fig. 1, and are automatically rotated to bring their slots into alignment with the openings formed by said partitions.

When the slot in the valve stands in a vertical position, as is illustrated by the upper valve in Fig. 1, the barley will fall through it into the upper chamber of the hopper I; and when the slot in the valve stands in a horizontal position, as illustrated by the lower valve in said figure, the passage from the upper to the lower chamber in the hopper I is closed.

The valves M, which control the passage of the grist from the revolving barrel into the surrounding casing N, are constructed in the same manner. The casing N is formed of two stationary wooden rings, 3, which support plates of zinc or similar metal, which form an exterior fixed casing. These rings 3 are fitted tightly against the metal arms 4 of the barrel by means of felt packing, so as to form a tight joint.

The mechanism for operating the controlling-valves L M, which feed the barley and deliver the grist, consists of two disks, 5 5, placed parallel with each other upon shafts 16 6. These disks receive their motion from worms $b$ 7 fixed to the said shafts. The worm $b$ is fastened on the neck K of the barrel A, and, turning with it, meshes with a gear, while the worm 7 is fastened to the standard H by a bracket, 8, and imparts motion to the gear $c$.

The shaft 6 is fastened to the side of the barrel A by brackets 12, and moves slowly with it, carrying the gear which is engaged with the worm 7, and thus slowly turning the shaft 6, and with it the disks 5, the worm 7, in this instance, however, being stationary, and the gear on the shaft 6 moving around it. The shaft 16 is fixed in a vertical position to the frame-work by means of brackets 13, and is revolved slowly in the same manner as the shaft 6 is revolved. The upper disk 5 is provided with teeth $f$, and the lower disk 5 with slots $e$, which engage tappets 19 on the shafts 20 of the valves, and rock the same to alternately open and close their slots or ports, in the following manner: The tappets 19 are triangular in form, as seen in Fig. 5. As the disks 5 5 rotate, one of the teeth $f$ on the upper disk engages one angle of the triangular tappet, and rocks it and the valve to which it is attached about one-quarter of a revolution before the tooth is free to pass by the tappet. In this part revolution the bottom of the tappet is projected into the slot $e$ of the lower disk, (see dotted lines, Fig. 5,) so that one of its lower angles will engage with the end of the slot $e$, and thus the tappet will be rocked back to its former position and the valve again closed. This is illustrated in the plan view, Fig. 5. The bearing-surfaces of the tappet are curved slightly, as shown, to facilitate their action. The upper disk is provided with an elongated hub, by which it is fastened upon its shaft. The lower disk is fastened upon this hub by a nut, $g$, and may be moved to the right or left with respect to the upper disk by loosening said fastening-nut and shifting the holding-pin $h$, Fig. 4, into the proper hole (see Fig. 6) of the hub of the upper disk.

By thus adjusting the disks, and consequently the relation of the teeth $f$, to the slots $e$, the time of opening and shutting the valves may be regulated.

A scale on the outer circumference of the disks may be provided to indicate the relative position of one disk to the other.

There are three sets of disks on the shaft 16, the two upper ones of which operate to control the feeding in of the barley, while the lower one governs a valve, $l$. This valve $l$ is so arranged that the grist, falling out of the casing N surrounding the barrel through an opening, $m$, is guided either to the right or the left, according to the position of said valve $l$. The change of position of this valve $l$ is regulated so that the bran, which continually escapes through the lattice of the barrel, falls out on one side, while the valve $l$ shifts over to the other side as soon as one of the valves M has moved, so as to open the passage and allow the ground barley to pass out.

It is obvious that by this arrangement the article obtained is a much cleaner one than could be obtained in ordinary mills.

What is claimed is—

1. The combination of the disks 5 5 with the valves, the construction being such that said disks are adjustable with relation to each other so as to govern the time of opening and shutting the valves they operate, substantially as described.

2. The valve-controlling mechanism consisting of disks 5, provided with slots $e$ and teeth $f$, mounted upon a revolving shaft, substantially as described.

3. A grist feeding and discharging mechanism consisting of valves L and $l$, automatically operated by the revolving barrel, substantially as described.

4. The combination, with disks 5 5, of their supporting-shaft and the worm and gear for actuating them, substantially as described.

In testimony whereof I have signed my name to this specification in the presence of two subscribing witnesses.

MORITZ MARTIN.

Witnesses:
CARL PIEPER,
PAUL KASTEN.